INVENTORS
Charles R. Downs
Charles G. Stupp
BY
Chas. W. Mortimer
ATTORNEY

Patented Aug. 14, 1923.

1,464,845

UNITED STATES PATENT OFFICE.

CHARLES R. DOWNS AND CHARLES G. STUPP, OF CLIFFSIDE, NEW JERSEY, ASSIGNORS TO THE BARRETT COMPANY, A CORPORATION OF NEW JERSEY.

APPARATUS FOR PRODUCING CHEMICAL REACTIONS.

Application filed June 4, 1920. Serial No. 386,612.

*To all whom it may concern:*

Be it known that we, CHARLES R. DOWNS and CHARLES G. STUPP, citizens of the United States, residing at Cliffside, in the county of Bergen and State of New Jersey, have invented certain new and useful Improvements in Apparatus for Producing Chemical Reactions, of which the following is a specification.

This invention relates to an apparatus for the removal of exothermic heat generated by chemical reactions in the vapor phase, and the regulation of the temperature of these reactions. It is particularly concerned with such reactions occurring in the presence of a catalytic substance and is intended to provide a means for controlling the temperature of such reactions with especial accuracy, so that yields in such processes are in general higher than in previously used forms of apparatus.

When a vaporous mixture of substances whose interaction is desired is brought into contact with a suitable catalyst, the reaction begins presumably at the various portions of the catalytic surface which are actually presented and accessible to the vapor mixture. If it be an exothermic reaction, heat is produced in accordance with the degree of the exotherm and the nature of the reaction. This heat distributes itself between the solid catalytic substance and the gaseous or vaporous reaction mixture, causing the temperature of both to rise. Since the mass of the solid substance is many times that of the gaseous film of reaction mixture which is immediately contiguous and which shares the heat, it follows that the actual quantity of heat absorbed by the catalyst is great in proportion to that absorbed by the gas while undergoing the same temperature rise. This heated gas passes on and a fresh portion of gas is presented to this part of the catalyst whose temperature has also risen in producing the reaction of the first portion. This first portion of gas which has passed on to a new catalytic region, contains now some of the products of the reaction and is somewhat impoverished in the original reagents. As the process continues therefore, assuming that heat is removed only by the gas as it passes through the catalytic environment, this catalytic environment progressively increases in temperature, the increase being greatest at the initial portion of the catalyst mass and decreasing until it is least at the last portion. Now the extent of this temperature rise in the catalytic environment will depend upon the reaction in question. Provided the exothermic heat is no greater than can be absorbed by the reaction gases, the catalyst temperature will rise only to such a point that the reaction gases as they rise from their initial temperature to this catalyst temperature, exactly absorb the heat produced in the reaction, and it is only necessary therefore to control the inlet gas temperature to control the catalyst temperature. In cases where the thermal capacity of the gases is exceeded by the exotherm the catalytic environment would continue to accumulate heat. Furthermore, even in cases where the thermal capacity of the gases exceeds the exotherm of the desired reaction, it so happens that unless the temperature for the desired reaction is carefully regulated, the reagents speedily pass on to other, undesirable reactions whose exotherms are greater than the thermal capacity of the gases, which therefore, still further aggravate the question of catalyst temperature.

This is especially true in that large class of reactions in which an organic substance is partially or selectively oxidized.

It is evident therefore, that special expedients must frequently be resorted to for heat removal and temperature control and numerous forms of apparatus have been devised whose purpose was the successful conduction of these reactions. These expedients have in the prior art been many and varied. A familiar device is that of embedding in the catalyst mass, pipes containing circulating fluids which by reason of their specific heat remove heat from the catalyst body itself. If the heat generated is great, however, the amounts of fluid are so large as to be impracticable unless the temperature difference between the catalyst and the fluid is great, and this in turn is objectionable, because regions of the catalyst immediately adjacent to the cooling pipes are cooled below the desired point. The result is that an excess of catalyst must be used in order to have the proper amount at the proper temperature. In other arrangements, the catalytic containers are made sufficiently restricted in diameter so that heat removal is effected by conduction to the sides or walls and radiation from these walls. This, however, presents the difficulties always attending tubular forms of apparatus and is mechanically very complicated. In each instance it is usually found that the apparatus in question is suitable only for a particular reaction or a limited class of reactions.

In our co-pending application Ser. No. 265,777, filed Dec. 7, 1918, we have already made a decided improvement over any of the previously known methods of controlling catalytic reactions, but it is the object of the present invention to provide an apparatus which allows greater latitude as well as greater delicacy than is available or possible in any of the previously known forms of apparatus.

In the present invention the reaction gases or the mixture of vaporous substances whose interaction is desired, pass into contact with a catalytic mass under conditions of temperature pressure, proportion, etc., which depend upon the particular reaction in question. Different reactions require widely different periods of contact to obtain the desired percentage of conversion and it is frequently desirable to subdivide the region of reaction or the catalytic environment into layers in each of which a part of the reaction is completed. By catalyst layer in this invention it is to be understood that we designate any thinly disposed region of reaction or catalytic environment, whether the catalyst be in the form of wire gauzes or deposited on lumps of inert material as a carrier or any other of the many forms well-known in the art of the industries using catalysts. This invention is not concerned with the form of the catalyst and is not restricted to any particular form. Whether there be one or more of these so-called layers of catalyst, each layer is provided with a regulatable cooling means on each of its two opposite and exposed sides, and the effect of one layer or subdivision on another is prevented by the interposition of radiation screens between each two layers. Finally, extraneous cooling or heating effects are prevented by the maintenance of the shell or wall of the reaction chamber at or near the desired temperature for the reaction. As the vaporous reaction mixture is brought into contact with the first layer of the catalytic substance, heated to the proper temperature for reaction, the reaction begins, heat is generated in the reaction zone, i. e., throughout the mass of the catalytic substance, and the temperature of both this substance and the gaseous mixture rises. Before the reaction proceeds too far and forms products of combustion or decomposition or other undesirable substances, and before the temperature of the gases rises too high they pass out of contact with the catalytic substance and meanwhile heat is continuously abstracted from the latter by the above-mentioned cooling means placed on two opposite sides, not in contact, but in close proximity, so that the removal of heat is effected by radiation from the surfaces of the layer to the two cooling means respectively. These cooling means are independently regulatable and required amounts of a cooling fluid can be made to flow through them at proper speed and temperature. Some small amount of heat is removed by convection due to the small temperature rise of the gases themselves, but in the case of a greatly exothermic reaction, such as the partial oxidation of organic substances, this amount is a negligible one compared to the total. It will be readily seen that a small variation in temperature must exist between the outer surfaces of the contact layer and its central stratum. This difference will depend on the degree of the exotherm, the thickness of the layer, the heat conductivity of the catalytic substance itself or of the base or carrier upon which it is impregnated and so on. We do not wish to limit ourselves to specific conditions in this respect since the accommodation of each reaction will determine these factors within the skill of a worker in the art and within the scope of this invention.

The gaseous mixture, in which the desired reaction has now been started and is partially completed, passes from the first catalytic layer through a non-catalytic screen or perforated plate or combination of screens or plates, into a second compartment containing a catalytic layer similar to the first and provided also with similar cooling means juxtaposed to the two opposite surfaces. Here the reaction proceeds further, and heat is removed as before by the cooling means. This process is repeated by providing a number of such sections, each containing the catalytic layer and two cooling means, and each separated from adjacent sections by radiation screens, this number being such as to allow the reaction to proceed as far as is desirable or feasible.

The function of the radiation screens is an important feature of our invention and will be readily understood when it is explained that in such reactions the heat formation is not always evenly allocated to the different layers or even throughout all strata of the same layer, so that it frequently happens that much larger quantities of cooling fluid are needed in one section than in another, or in the one or the other cooling means in the same section. To prevent transfer of heat from one catalyst layer to any of the cooling means in an adjacent section or in other words to make each catalyst layer entirely independent of any cooling means but those in its own section, it has been found necessary to interpose a screen so devised that it shall permit the passage of the reaction mixture but shall obstruct or effectually intercept radiant heat.

Finally, in order that control of the reaction and of the temperature of the catalyst shall be by the cooling means themselves, and that the effect shall therefore be more uniform over the whole area of the tray, extraneous cooling effects or excessive heating effects are eliminated by maintaining the exterior shell or wall of the reaction chamber itself at or very near reaction temperature, so that substantially no radiation occurs between its inner surface and the catalyst layers. This is done for example by providing a flue or furnace chamber around the reaction or contact chamber, through which flue are passed gases from an oven heated by any means such as by a gas or oil burner or fire, etc. Other suitable methods of maintaining the reaction chamber walls at the proper temperature such as heating electrically, will be known to those familiar with the art and can be practiced within the spirit of the invention. Such means are of course suitable for originally bringing the apparatus to the desired temperature as well as maintaining this temperature.

The invention can be still better understood by reference to the drawing, which illustrates diagrammatically a form of apparatus found to work well in practice, although it must be realized that this is but one of a number of arrangements which could be made to embody our invention.

Figure 1:
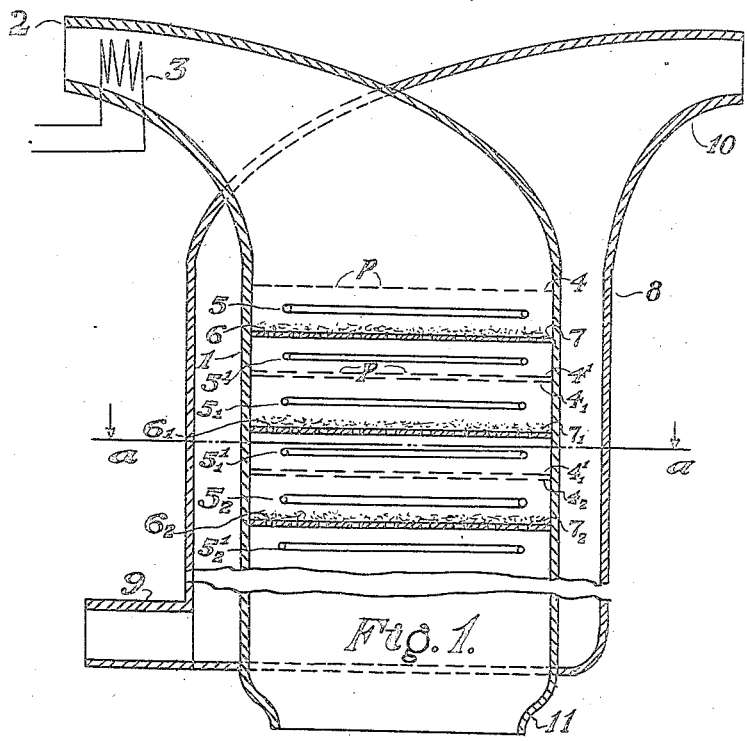
Figure 1 is a vertical section through the apparatus.
Figure 2:
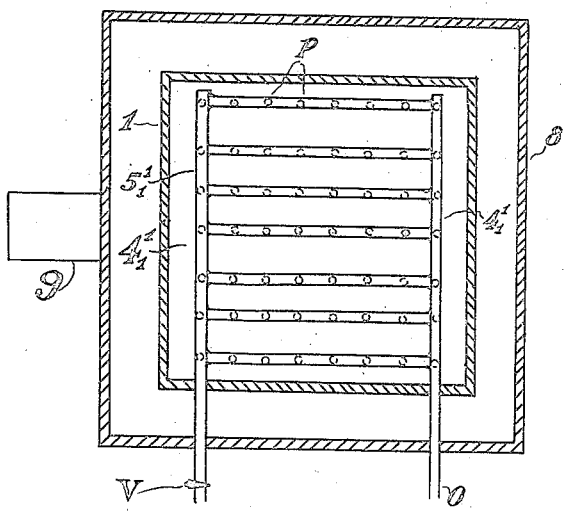
Figure 2 is a horizontal section on the line $a-a$.

In the drawings, reference character 1 indicates a reaction chamber which is provided with an inlet 2. In the inlet 2 is shown heating means 3 which may be used for heating the incoming reaction materials if desired, or this heating may be done by any other suitable means. A series of plates, 4, 4', 4$_1$, 4'$_1$, etc. provided with perforations $p$ are disposed in the reaction chamber as shown. The perforations $p$ of a pair of juxtaposed plates such as 4' and 4$_1$, which constitutes the screen separating any two adjoining sections, are staggered.

A number of temperature regulating means 5, 5', 5$_1$, 5'$_1$, etc., are disposed as shown and the layers of catalyst, 7, 7$_1$, 7$_2$, etc., are placed between each pair, so that as we proceed through the reaction chamber the order of elements is, screen, temperature controlling means, catalyst layer, temperature controlling means, screen etc. This group constitutes a section and is duplicated as many times as there are sections.

The flow of fluid through the temperature controlling means 5 etc. is regulated by means of valves V. The catalyst layers 7, 7$_1$, etc. may be supported on perforated screens, 6, 6$_1$, 6$_2$, or in any other suitable manner, or as stated above these layers may consist of wire gauze or combination of gauzes or screens.

The reaction chamber 1 may be surrounded by a casing 8 provided with suitable inlets and outlets such as 9 and 10 whereby fluids may be circulated for the purpose of heating and maintaining the walls of the reaction chamber at the desired temperature.

When the device is in operation, a reaction mixture is introduced through the inlet 2, heated either wholly or partially to reaction temperature as desired, by heating means such as 3, and then passes successively through the screens 4, the temperature controlling means 5, the catalyst 7, the temperature controlling means 5', the screens 4' and 4$_1$, and so on to the outlet 11. In the case of an exothermic reaction, heat is generated in the catalyst layer 7, a substantial portion of this heat is transferred by radiation against the gas stream to cooling means 5, another substantial portion is transferred by conduction to supporting means 6 and then by radiation to cooling means 5'. A minor portion is transferred to the reaction gas itself and this is removed by the actual contact of these gases with cooling means 5'. It is evident therefore that by independent regulation of 5 and 5' the temperature of the whole mass of catalyst 7 and of the reaction gases can be prevented from rising to an undesirable point and in fact can be controlled within the limits most desirable for the progress of the reaction. The cooling means, 5', 5'$_1$ 5'$_2$, etc., having the double burden of cooling both the catalyst layer and the reaction gases, frequently require larger amounts of cooling fluid than 5, 5$_1$, 5$_2$, etc., and the interposition of the screens between sections serves to prevent these cooler elements affecting the catalyst layers below them. The apparatus therefore, consists of a series of practically independent sections or inter-communicating chambers included respectively between 4 and 4', 4$_1$ and 4'., etc., and the flexibility so obtainable is readily apparent.

Variations in most of the details of this apparatus can be made without departure from the spirit and scope of our invention. It may be adapted to many reactions whose different conditions may require changes within the art and skill of the worker. Thus the catalyst layers may vary in number and in thickness, they may progressively increase in thickness a condition sometimes advisable due to the progressive change in composition of the vapor mixture as it passes from one layer to the next, and they may progressively increase in temperature for the same reason. The cooling means may be of any suitable design such as a row of interconnected pipes or loops of pipe, and the cooling fluid may be water, air or steam or any suitable fluid substance or mixture of such substances whose temperature and rate of flow can be regulated as desired. The radiation screens may consist of an ordinary perforated plate, of metal, or other material, which can reflect radiant heat, or of two such plates arranged as shown in the drawing, the latter arrangement being more effective. It is of course important that the screens reflect as much and absorb as little heat as possible but since complete reflection is impossible, the improved double screen with the staggered perforations not only intercepts radiation more completely but prevents the absorbed heat being transferred to the next section so readily by its included small space between the two elements or plates.

The apparatus may be used for the conduction of a wide variety of exothermic vapor phase reactions among which are the catalytic, partial oxidations of benzene, naphthalene, anthracene toluene, phenanthrene, analine, ortho-cresol, phenol, xylene, methyl alcohol and ethyl alcohol, aliphatic hydrocarbons, ammonia, $SO_2$, etc. It is also adapted to use in chlorinations and in fact to any vapor phase reactions in which close temperature control is an advantage. It is not our intention that the apparatus be restricted to use with any particular catalyst or reacting substances.

We claim:

1. In an apparatus for controlling the temperature of chemical reactions, a zone in which chemical reaction takes place, a temperature regulating means in proximity to but out of contact with said zone, and heat reflecting means on the other side of said temperature regulating means from said zone.

2. In an apparatus for controlling the temperature of chemical reactions, a catalyst support, a temperature regulating means in proximity to but out of contact with said support, and heat reflecting means on the other side of said temperature regulating means from said support.

3. In an apparatus for controlling the temperature of chemical reactions, a support for a thin layer of catalyst, cooling means disposed on each side of said support in close proximity thereto, but out of actual contact therewith, and heat reflecting means near said cooling means on the other side of said cooling means from said support.

4. In an apparatus for controlling the temperature of chemical reactions, heat reflecting means, cooling means, a reaction zone, cooling means, and heat reflecting means disposed in a reaction chamber adjacent each other in the order specified.

5. In an apparatus for controlling the temperature of chemical reactions, two independently controlled temperature regulating means, and a heat reflecting means between and substantially parallel with and out of contact with said temperature regulating means.

6. In an appartus for controlling the temperature of chemical reactions, two supports for two layers of catalyst, two independently controlled temperature regulating means between and substantially parallel with and out of contact with said supports and heat reflecting means between said temperature regulating means.

7. In an apparatus for controlling the temperature of chemical reactions, two supports for two layers of catalyst, two independently controlled cooling grids between said supports and heat reflecting means between said cooling grids.

8. In an apparatus for controlling the temperature of chemical reactions, two supports for two layers of catalyst, two independently controlled cooling grids between said supports and heat reflecting means between said cooling grids, said heat reflecting means consisting of perforated plates having the perforations in staggered relation.

9. In an apparatus for controlling the temperature of chemical reactions, heat reflecting means, cooling means, a reaction zone, cooling means, and heat reflecting means disposed in a reaction chamber adjacent each other in the order specified, and means for controlling the temperature of the outside of said reaction chamber.

10. In an apparatus for controlling the temperature of chemical reactions, heat reflecting means, cooling means, a reaction zone, cooling means, and heat reflecting means disposed in a reaction chamber adjacent each other in the order specified, and a flue surrounding said reaction chamber.

11. In an apparatus for controlling the temperature of chemical reactions, a pair of heat reflecting plates, a pair of independently controlled temperature regulators between said pair of plates, and a support for catalytic material between said regulators out of contact with the same.

12. In an apparatus for conducting exothermic chemical reactions in the vapor phase, a series of intercommunicating chambers, each containing a support for a layer of catalytic substance, independently regulatable cooling means on each of two opposite sides of said support, out of contact therewith but in close proximity thereto, means between each two adjacent chambers for substantially preventing the passage of heat by radiation from one chamber to another, and means for maintaining the walls of said chambers near the desired reaction temperature.

13. In an apparatus for conducting exothermic chemical reactions in the vapor phase, a reaction chamber containing a support for a layer of catalytic substance, independently regulatable cooling means on each of two opposite sides of said support out of contact therewith but in close proximity thereto, and means for maintaining the walls of said chambers near the desired reaction temperature.

14. In an apparatus for conducting exothermic chemical reactions in the vapor phase, a chamber containing a layer of catalytic substance constituting a reaction zone, independently regulatable cooling means on each of two opposite sides of said zone out of contact with said catalytic substance but in close proximity thereto so that transfer of heat from the catalytic zone to the cooling means is substantially by radiation, and means for substantially preventing undesirable direct passage of heat from the said chamber by radiation.

15. In an apparatus for conducting exothermic chemical reactions in the vapor phase, a disposition of elements throughout a series of inter-communicating chambers substantially as described so that the gaseous reaction mixture traverses successively in each chamber a heat reflecting mean, a cooling means, a thinly disposed catalyst zone, a cooling means, and a heat reflecting means in the order specified.

In testimony whereof we affix our signatures.

CHARLES R. DOWNS.
CHARLES G. STUPP.